(12) United States Patent
Suga

(10) Patent No.: US 6,418,102 B1
(45) Date of Patent: Jul. 9, 2002

(54) METHOD AND APPARATUS FOR PERFORMING OPTIMUM LASER POWER CALIBRATION ON OPTICAL DISKS

(75) Inventor: Satoshi Suga, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/422,359

(22) Filed: Oct. 21, 1999

(30) Foreign Application Priority Data

Oct. 26, 1998 (JP) ............................................ 10-304263
May 28, 1999 (JP) ............................................ 11-150207

(51) Int. Cl.$^7$ ................................................ G11B 5/09
(52) U.S. Cl. ................................ 369/47.53; 369/53.27; 369/53.31
(58) Field of Search ........................... 369/44.27, 44.29, 369/44.31, 44.32, 44.33, 44.35, 47.17, 47.28, 47.32, 47.5, 47.51, 47.53, 47.55, 53.26, 53.27, 53.31, 53.33, 53.37, 116

(56) References Cited

U.S. PATENT DOCUMENTS 5,469,415 A * 11/1995 Fujita et al. ............. 369/47.17
5,563,862 A * 10/1996 Udagawa ............. 369/53.31 X

FOREIGN PATENT DOCUMENTS

JP          06-176364          6/1994

* cited by examiner

Primary Examiner—Paul W. Huber
(74) Attorney, Agent, or Firm—Dickstein Shapiro Morin & Oshinsky LLP

(57) ABSTRACT

An optical disk recording apparatus comprising a memory, a laser recording unit, a first motor, a second motor, an asymmetry information detect mechanism, and a controller is disclosed. The memory stores an initial recording laser power and a reference asymmetry of a playback signal. The laser recording unit emits laser light according to a recording laser power and records data using the laser light on an optical disk rotated by the first motor. The second motor moves the laser recording unit along the surface of the recordable optical disk. The asymmetry information detect mechanism detects asymmetry information of a playback signal from data recorded. During an optimum laser power calibration, the controller instructs the first motor to rotate the recordable optical disk at a linear velocity which is the same as a linear velocity at which the data recording is to be performed at the specific area and performs a test recording at a test location for a predetermined number of times using the initial recording laser power with a stepwise change each time so as to determine an optimum recording laser power according to the selected optimum asymmetry closest to the reference asymmetry.

36 Claims, 4 Drawing Sheets

METHOD AND APPARATUS FOR PERFORMING OPTIMUM LASER POWER CALIBRATION ON OPTICAL DISKS

CROSS-REFERENCE TO FOREIGN APPLICATIONS

This document claims priority rights of and is based on Japanese patent application Nos. JPAP10-304263 filed on Oct. 26, 1998 and JPAP11-150207 filed on May 28, 1999 in the Japanese Patent Office, the entire contents of which are hereby incorporated by reference.

BACKGROUND OF THE INVENTION

1. Field of the Invention

The present invention generally relates to a method and apparatus for optical disk recording, and more particularly to a method and apparatus for optical disk recording which is capable of efficiently performing an optimum laser power calibration on a recordable optical disk including a CD-R (compact disk recordable), and a CD-RW (compact disk re-writable).

2. Description of the Related Art

Reading and writing techniques for compact disks (CD) used as optical mass-storage mediums for computers have greatly been improved in recent years. As a result, many types of compact disks have been developed. These types includes CD-ROM (compact disk read only memory), CD-R (compact disk recordable), and CD-RW (compact disk re-writable). While CD-ROM is a read only memory type compact disk, CD-R and CD-RW are recordable. The CD-R is a one-time data recordable type that allows users to write once so as to manufacture salable disks. The CD-RW is a re-writable type that allows writing, reading, and erasing multiple times.

In general, the laser power required for an optical disk recording is variable and is dependant upon various characteristics of an optical disk, such as the magnetic recording medium, the laser diode employed in the recording drive unit, etc. An optimum laser power calibration is a common technique to prevent such a problem. Typically, the optimum laser power calibration includes performing a test recording before executing an actual data recording by applying laser power with a stepwise change in a power calibration area (PCA) which is normally allocated in the innermost track of an optical disk. In addition, many optical recording apparatus perform the optimum laser power calibration by controlling the optical disk to rotate at a constant linear velocity (CLV) during recording so as to satisfy a data recording format for the constant linear velocity, which is a widely used data recording format for a CD (compact disk) recording. However, this CLV data recording requires an accurate control of a spindle motor in order to achieve the constant linear velocity. When the spindle motor rotates at a higher velocity, the control must be more accurate and the time to stabilize the rotation is increased.

In recent years, there has been a clear trend for a faster transmission than the standard transmission rate with respect not only to playback of an optical disk but also to recording. For this reason, an optical disk recording apparatus is expected to use a constant angular velocity (CAV) for the CLV formatted disks as well as for the CAV formatted disks.

However, the CAV recording is problematic in that the optimum recording condition varies with the linear velocity. This problem becomes more apparent with higher linear velocity. In particular, a relatively great gap of the linear velocity may be generated between the PCA allocated at the innermost track and the data area in which an actual data recording is performed.

There have been provided several optical disk recording apparatus which increase laser power in order to record data at a rotation velocity higher than a standard rotation velocity and which have been thought as to be able to solve the above-described problem. Japanese Laid-Open Patent Publication No. 06-176364 (1994) is one example of these apparatus. However, these apparatus cannot ensure a successful high-speed data recording relative to an optical disk rotating at a constant angular velocity.

SUMMARY OF THE INVENTION

Accordingly, an object of the present invention is to provide a novel optical disk recording apparatus that is capable of efficiently performing an optimum laser power calibration.

Another object of the present invention is to provide a novel method for efficiently performing an optimum laser power calibration on a recordable optical disk.

To achieve these and other objects, a novel optical disk recording apparatus includes a memory, a laser recording unit, a first motor, a second motor, an asymmetry information detect mechanism, and a controller. The memory stores data including values of an initial recording laser power and a reference asymmetry of a playback signal. The laser recording unit emits laser light, where the amount of laser light emission is determined according to a value of a recording laser power supplied, and records data, using the laser light emitted, on a recording surface of a recordable optical disk having a data recording area and a test recording area thereon. The first motor rotates the recordable optical disk. The second motor moves the laser recording unit in and out along a radius of the recording surface of the recordable optical disk. The asymmetry information detect mechanism detects asymmetry information of a playback signal from data recorded in the recordable optical disk. The controller performs an optimum laser power calibration relative to a specific area in the data recording area when required to record data in a specific area. During the optimum laser power calibration, the controller instructs the laser recording unit to move to a test location in the test recording area and the first motor to rotate the recordable optical disk at a linear velocity which is the same as the linear velocity at which the data recording is to be performed at the specific area and performs the test recording at the test location for a predetermined number of times using the initial recording laser power stored in the memory with a stepwise change each time. Further, the controller reads asymmetry values of playback signals detected by the asymmetry detect mechanism from data recorded by the test recording, selects an optimum asymmetry value closest to the reference asymmetry, and determines an optimum recording laser power according to the selected optimum asymmetry.

In one preferred embodiment, the controller performs the optimum laser power calibration when there is a relatively small difference of inner radius between locations of starting and ending of data recording in the data recording area.

The controller may divide the specific area into a plurality of data fields and the test recording area into a same plurality of test fields, perform the optimum laser power calibration relative to each of the plurality of data fields using each of the same plurality of test fields, and may store to the memory the optimum recording laser power determined for each of the plurality of data fields through the optimum laser power calibration.

In another preferred embodiment, the controller performs the optimum laser power calibration when there is a relatively great difference of inner radius between locations of starting and ending of data recording in the data recording area.

The controller may divide the data recording area into a plurality of data fields and the test recording area into a same plurality of test fields, perform the optimum laser power calibration relative to each of at lease one of the plurality of data fields where data is recorded using at least one of the same plurality of test fields, and may store to the memory the optimum recording laser power determined for each of the at least one of the plurality of data fields through the optimum laser power calibration.

Further, the above-mentioned optical disk recording apparatus may include a laser light detect mechanism for detecting an amount of the laser light which is emitted by the laser recording unit during the test recording. Then, the amount of the laser light detected by the laser light detect mechanism may be stored in the memory together with the optimum recording laser power determined according to the selected optimum asymmetry.

The controller may record the optimum recording laser power determined through the optimum laser power calibration in each of the plurality of data fields.

The controller may increase the frequency of a laser pulse for generating the laser power in proportion to an increase of the linear velocity during the data recording and the test recording.

Further, to achieve the above-mentioned objects, a novel method for performing an optimum laser power calibration on an optical disk includes the steps of storing, providing, and executing. The storing step stores values of an initial recording laser power and a reference asymmetry of a playback signal. The providing step provides laser recording means, which is movable in and out along a radius of the recording surface of the recordable optical disk, for emitting laser light, where the amount of laser light is determined according to a value of a recording laser power supplied, and recording data, using the laser light emitted, on a recordable surface of a recordable optical disk having a data recording area and a test recording area on a recording surface thereof The executing step executes an optimum laser power calibration relative to a specific area in the data recording area when required to record data in the specific area. The optimum laser power calibration includes the steps of instructing, rotating, performing, detecting, reading, selecting, and determining. The instructing step instructs the laser recording means to move to a test location in the test recording area. The rotating step rotates the recordable optical disk at a linear velocity which is the same as a linear velocity at which the data recording is to be performed at the specific location. The performing step performs a test recording at the test location for a predetermined number of times using the initial recording laser power with a stepwise change each time. The detecting step detects asymmetry information of a playback signal from data recorded in the recordable optical disk during the test recording. The reading step reads asymmetry values of the playback signals generated through the test recording for the predetermined number of times. The selecting step selects an optimum asymmetry value closest to the reference asymmetry. The determining step determines an optimum recording laser power according to the selected optimum asymmetry.

Other objects, features, and advantages of the present invention will become apparent from the following detailed description when read in conjunction with the accompanying drawings.

BRIEF DESCRIPTION OF THE DRAWINGS

A more complete appreciation of the present invention and many of the attendant advantages thereof will be readily obtained by reference to the following detailed description when considered in connection with the accompanying drawings, wherein.

DESCRIPTION OF THE PREFERRED EMBODIMENTS

Figure 1:
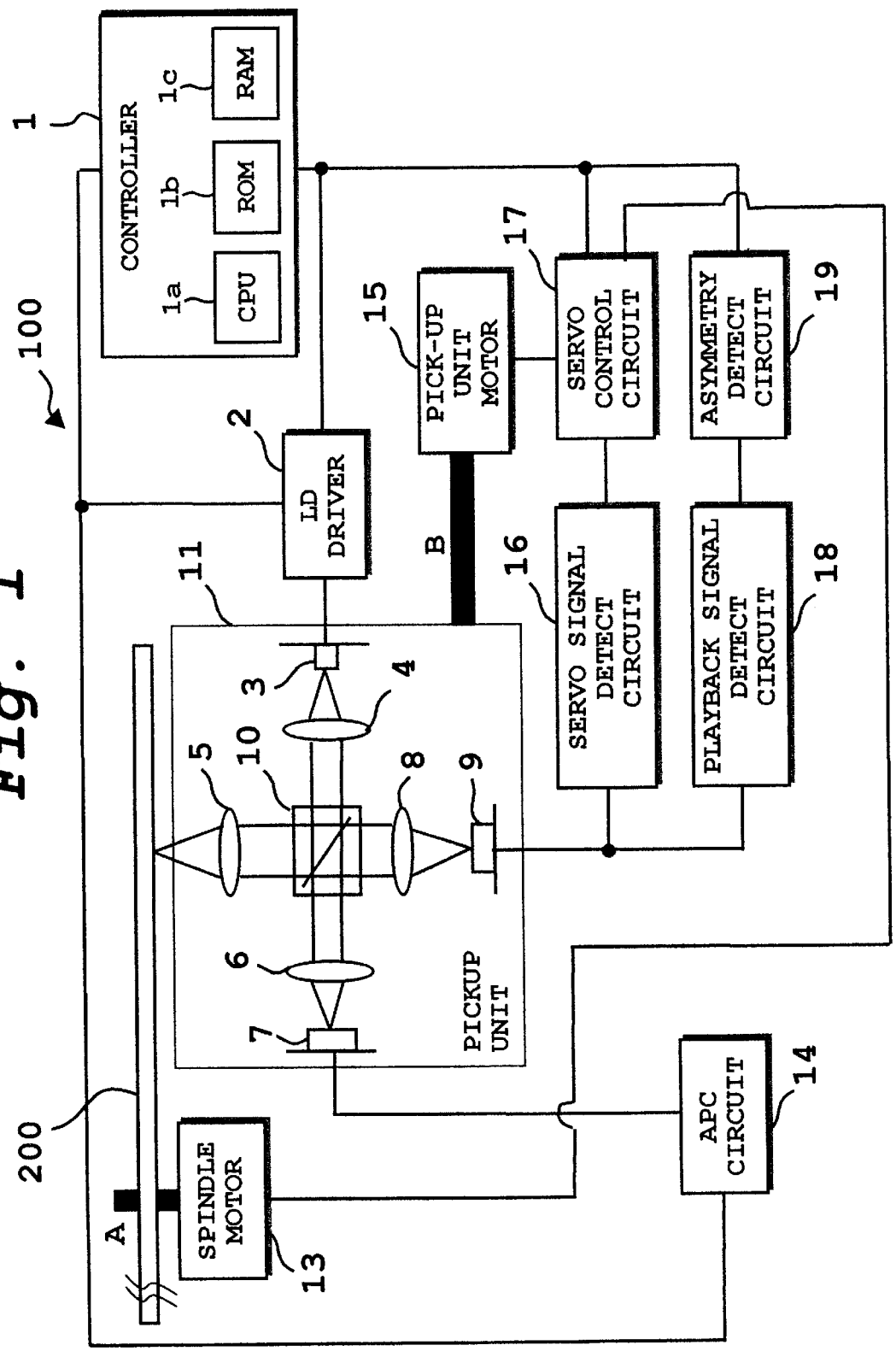
FIG. 1 is a block diagram of an optical disk recording apparatus according to an embodiment of the present invention.

In describing preferred embodiments of the present invention illustrated in the drawings, specific terminology is employed for the sake of clarity. However, the present invention is not intended to be limited to the specific terminology so selected and it is to be understood that each specific element includes all technical equivalents which operate in a similar manner.

Referring now to the drawings, wherein like reference numerals designate identical or corresponding parts throughout the several views, and more particularly to FIG. 1, there is illustrated a block diagram of an optical disk recording apparatus 100 according to an embodiment of the present invention.

The optical disk recording apparatus 100 of FIG. 1 includes a controller 1, a laser diode (LD) driver 2, a pick-up unit 11, a spindle motor 13, an auto power control (APC) circuit 14, a pickup-unit motor 15, a servo signal detect circuit 16, a servo control circuit 17, a playback signal detect circuit 18, and an asymmetry detect circuit 19. The pick-up unit 11 includes a laser diode (LD) 3, a collimating lens 4, an object lens 5, a first converging lens 6, a first photoreceptor 7, a second converging lens 8, a second photoreceptor 9, and a beam splitter 10. As shown in FIG. 1, an optical disk 200 is placed in the optical disk recording apparatus 100.

The controller 1 of FIG. 1 includes a CPU (central processing unit) 1a, a ROM (read only memory) 1b, and a RAM (random access memory) 1c. The CPU 1a controls the entire operation of the optical disk recording apparatus 100. The ROM 1b stores various control programs and fixed parameters which are used by the CPU 1a, and the RAM 1c stores various temporary parameters and data. The controller 1 is configured to determine a value of laser power for recording information on an optical disk (i.e., the optical disk 200) and to send it to the LD driver 2. The LD driver 2 is configured to generate a laser drive current corresponding to the value of the laser power determined by the controller 1 and applies it to the LD 3 of the pickup unit 11.

The LD 3 emits laser light in response to the laser drive current applied from the LD driver 2. The laser light emitted from the LD 3 enters the pickup unit 11 and is collimated therein by the collimating tens 4. The laser light collimated by the collimating lens 4 enters into the beam splitter 10.

The beam splitter 10 splits the emitted laser light into two beams of laser light and allows a first split laser light beam to advance to the first photoreceptor 7 through the first converging lens 6. Upon receiving the first split laser light beam, the first photoreceptor 7 converts the amount thereof into an electrical signal and transmits such a signal, as representing the amount of the first split laser light beam, to the APC circuit 14. The APC circuit 14 performs an auto power control (APC) according to this signal from the first photoreceptor 7. More specifically, the APC circuit 14 is configured to compare the amount of the first split laser light beam to a reference amount of laser light which is predetermined by the controller 1. Based on the result of this comparison, the APC circuit 14 controls the LD driver 2 to adjust the laser drive current so that the LD 3 constantly emits an optimum amount of laser light during the data recording operation relative to the optical disk 200. These operations of the APC circuit 14 are referred to as the APC.

A second split beam of laser light split by the beam splitter 10 is transmitted through the object lens 5, and reflected by the surface of the optical disk 200. After the reflection, the second split laser light beam passes through the object lens 5 and the beam splitter 10 and is converged by the second converging lens 8 to fall in focus on the second photoreceptor 9. Upon detecting the second split laser light beam, the second photoreceptor 9 converts the amount thereof into an electrical signal and transmits such a signal as representing the amount of the second split laser light beam to the servo signal detect circuit 16.

The servo signal detect circuit 16 is configured to detect this signal as a servo signal and transmits it to the servo control circuit 17 which controls the pickup-unit motor 15 to move the pickup unit 11 in and out along a radius of the optical disk. A thick line indicated by a letter B represents an interaction of the pickup-unit motor 15 with the pickup unit 11. Thus, the servo control circuit 17 performs various operations such as seek, track, and focus control operations. The servo control circuit 17 also controls the spindle motor 13 so as to control the rotation of the optical disk 200. A thick line indicated by a letter A represents an interaction of the spindle motor 13 with the optical disk 200.

The signal output from the second photoreceptor 9, based on the second split laser light beam, is also transmitted to the playback signal detect circuit 18 which is configured to detect a signal such as a playback signal. The playback signal detect circuit 18 sends the playback signal to the asymmetry detect circuit 19 which detects a value relative to an asymmetry status in the playback signal. The asymmetry detection is performed for a plurality of playback signals. Upon asymmetry detection by the asymmetry detect circuit 19, the controller 1 examines the values of the detected asymmetries and selects one which is closest to a reference asymmetry value. Then, the controller 1 determines an optimum recording power based on the selected asymmetry and applies it to the LD driver 2 during an optimum laser power calibration (OPC).

Figure 2:
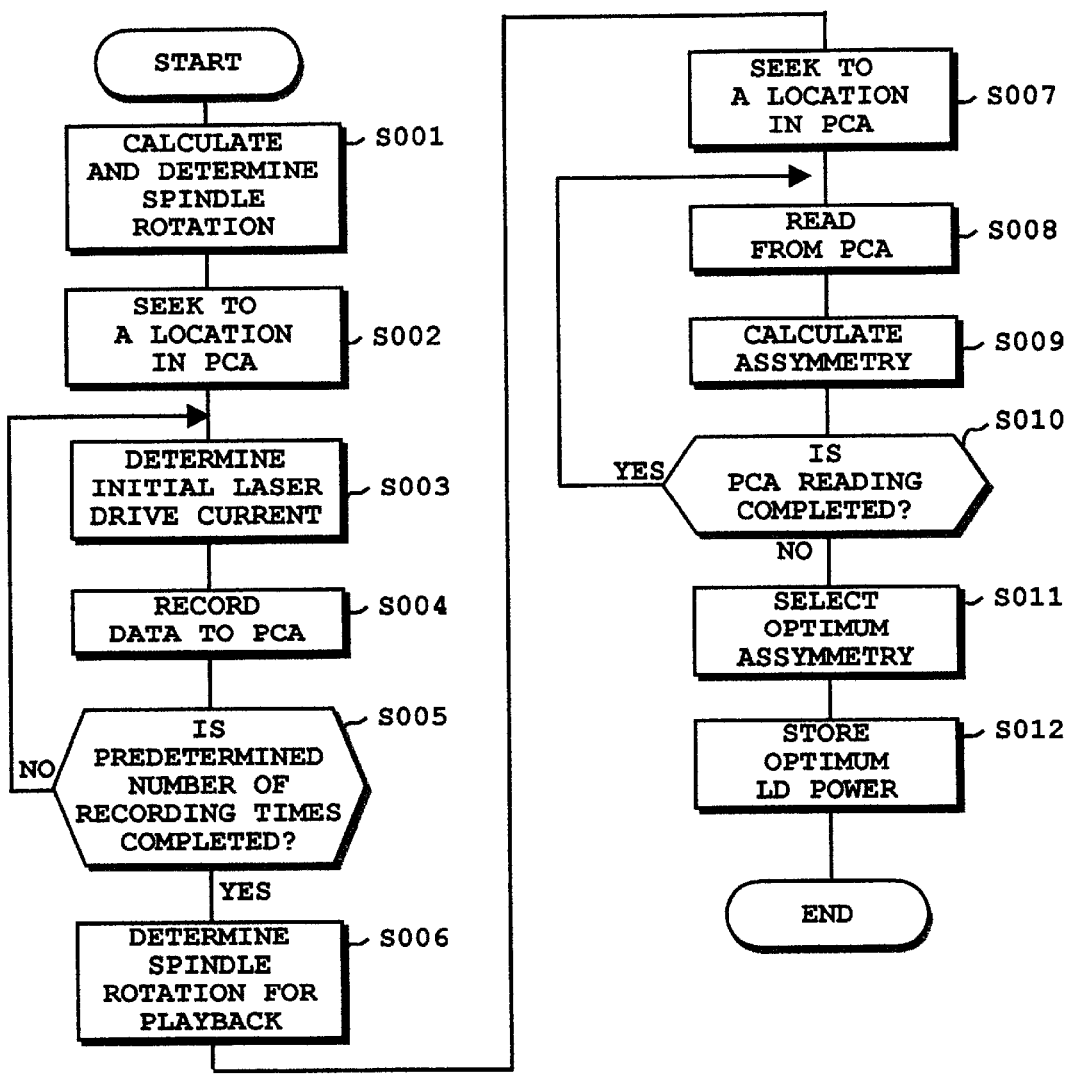
FIG. 2 is a flowchart explaining an example of the optimum laser power calibration (OPC) performed by the optical disk recording apparatus of FIG. 1.

Referring now to FIG. 2, an exemplary procedure of the optimum laser power calibration (OPC) is explained. When the optical disk recording apparatus 100 performs a data recording operation, it first performs an OPC in which a test recording operation is performed using test data to determine an optimum laser power to be used in the data recording operation. The innermost track of an optical disk (i.e., the optical disk 200) is allocated specifically to a power calibration area (PCA) in which the test data is recorded during the test recording operation.

In Step S001 of FIG. 2, the controller 1 calculates and determines a spindle angular velocity at which data is recorded at a specific location in the power calibration area of the optical disk 200 during the optimum laser power calibration. In this process, the controller 1 refers to the information of the data recording operation that requires the OPC. Such information includes a specific location in the normal data recording area at which data is to be recorded and a spindle angular velocity at which data is to be recorded at the specific location. Based on these kinds of information, the controller 1 calculates a linear velocity at which the data is to be recorded at the above-mentioned specific location in the normal data recording area. Then, the controller 1 calculates a spindle angular velocity to be used in the OPC such that a trial data recording is performed at a specific location in the power calibration area at the same linear velocity as the one to be used in the data recording operation. To rotate at the calculated spindle velocity, the controller 1 instructs the servo control circuit 17 to control the spindle motor.

In Step S002, the controller 1 instructs the servo control circuit 17 to move the pickup unit 11 to the specific location in the power calibration area. In Step S003, the controller 1 applies an initial value of the laser drive current, as a parameter for establishing a value of the recording laser power, to the LD driver 2. Such an initial value of the laser drive current is associated with an initial recording laser power which is stored in the ROM 1b (or the RAM 1c). In Step S004, the controller 1 instructs the LD driver 2 to record test data, which is prepared for a test recording, in the power calibration area.

In Step S5, the controller 1 checks if the LD driver 2 has performed the test recording operation for a predetermined number of times, each time the test data being recorded at a location different from the previous location. If the check result of Step S005 is NO, the process returns to Step S003 and the controller 1 applies an increased value of the laser drive current to the LD driver 2, so that the LD driver 2 performs another time of the test recording operation at a different location in Step S004. But, if the check result of Step S005 is YES, the controller 1 instructs the LD driver 2 to finish the test recording operation in the power calibration area and the process proceeds to Step S006. Alternatively, the controller 1 may determine a completion of the test recording operation by checking the largeness (size) of an area in which the test data is recorded in the check process of Step S005, instead of relying on time to check for completion.

In Step S006, the controller 1 instructs the servo control circuit 17 to control the spindle motor to rotate at a spindle velocity for playback. Then, in Step S007, the controller 1 instructs the servo control circuit 17 to move the pickup unit 11 to the specific location in the power calibration area in which the test recording operation has been performed. In Step S008, the controller 1 instructs the LD driver 2 to perform a reading operation with respect to the test data recorded at the specific location in the power calibration area. During the reading operation, a playback signal from the pickup unit 11 is detected by the playback signal detect circuit 18, and the asymmetry detect circuit 19 detects a value representing an asymmetry status of the playback signal. In Step S009, the controller 1 reads the value of the asymmetry status output from the asymmetry detect circuit 19.

In Step S010, the controller 1 checks if the LD driver 2 has completed the reading operation with respect to the data recorded during the test recording operation for the predetermined number of times. If the check result of Step S010 is NO, the process returns to Step S008 and the controller 1 instructs the LD driver 2 to perform the reading operation with respect to the next recorded data. Then, in Step S009, the controller 1 reads the asymmetry status output from the asymmetry detect circuit 19 and calculates an asymmetry value of the playback signal. But, if the check result of Step S010 is YES, the controller 1 instructs the LD driver 2 to finish the reading operation and the process proceeds to Step S011. By this time, the controller 1 holds a plurality of asymmetry values corresponding to the respective test data recorded during the test recording operation performed for the predetermined number of times.

In Step S011, the controller 1 compares the plurality of asymmetry values to a reference asymmetry value and selects one having the most closest value to the reference asymmetry value. The reference asymmetry value is stored in the ROM 1b (or the RAM 1c). In Step S012, the controller 1 determines an optimum recording laser power corresponding to the asymmetry value selected in Step S011 and stores it in the RAM 1c. Then, the OPC process ends. Alternative to the asymmetry information, a jitter of the playback signal may be used to determine the optimum recording laser power.

The above-described OPC process is suitable typically for a case where the variations of the linear velocity in the data recording area is relatively small. Suitable cases are, for example, when there is no difference of inner radius between locations of starting and ending of data recording, when the data recording is performed at a location in a relatively outer track, and when the data recording is performed at a spindle rotation speed which is relatively slow.

Figure 3:
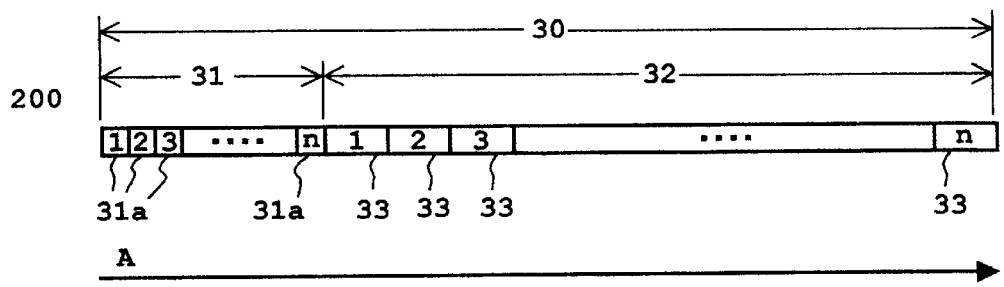
FIG. 3 is a flowchart explaining an example of a laser diode power adjusting operation performed by the optical disk recording apparatus of FIG. 1.

FIG. 3 illustrates a conceptual rendering of a structure of a data recordable area formed on the optical disk 200 with a data recording direction (indicated by a letter A). As shown in FIG. 3, the optical disk 200 includes an entire data area 30 representing an entire area where data is recordable. The entire data area 30 includes a test recording area 31 which is divided into a plurality of test sectors 31a and a data recording area 32 which is divided into a plurality of data sectors 33.

Preferably, the above-described OPC operation is performed relative to each of the data sectors 33 so as to obtain an optimum recording laser power for each of the data sectors 33. In this case, the size of the data sector 33 and a number of divisions thereof may be determined by the size of the power calibration area and an effectiveness which would be materialized over variations of the linear velocity in the determined data sector.

It is also preferable that the entire data area 30 is divided into a plurality of the data sectors 33 upon a start of data recording operation, regardless of an amount of recording data, and that the OPC operation is performed on each of the thus-divided data sectors 33 so as to obtain an optimum recording laser power for each of the data sectors 33 and to store it in the RAM 1c. Thus, a relatively large amount of data is divided into a plurality of data sectors 33 and, then, the OPC operation can easily be performed on each of the divided data.

Figure 4:
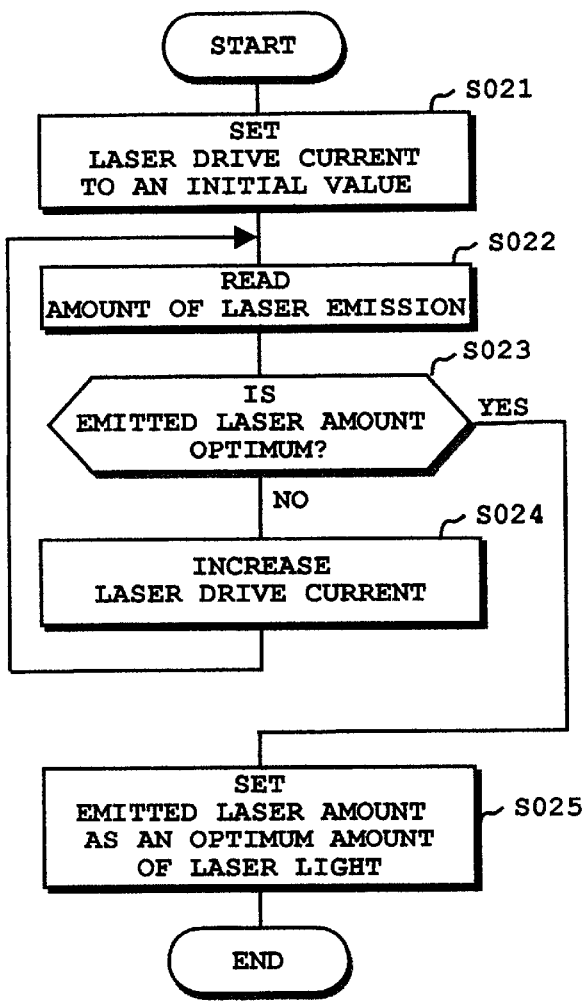
FIG. 4 is a flowchart explaining another example of the laser diode power adjusting operation performed by the optical disk recording apparatus of FIG. 1.
Figure 5:
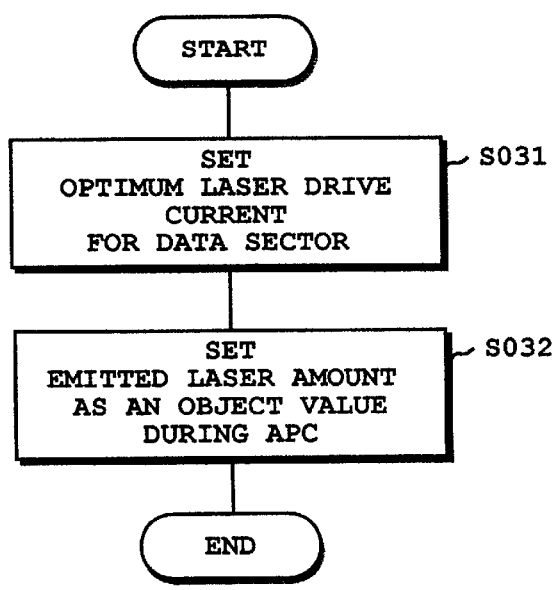
FIG. 5 is an exemplary format of recording area in an optical disk during the OPC of FIG. 2.

Referring now to FIG. 4, a description is made on an exemplary operation for determining a preferred amount of laser light based on the optimum recording laser power which the controller 1 has obtained through the OPC process. In Step S021, the controller 1 initially applies a laser drive current to the LD driver 2. In Step S022, the laser light is detected by the photoreceptor 7 through the first converging lens 6, etc., and the APC circuit 14 receives a signal representing an amount of the laser light from the photoreceptor 7. In Step S023, the APC circuit 14 compares the amount of the laser light from the photoreceptor 7 with a reference amount of the laser light which is predetermined by the controller 1. Based on the comparison, the APC circuit 14 determines if the laser light detected with the photoreceptor 7 has an optimum amount of laser light relative to the optimum recording laser power which the controller 1 has obtained through the OPC process.

If the check result of Step S023 is NO, the process proceeds to Step S024 and the APC circuit 14 instructs the LD driver 2 to increase the laser drive current. Then, the process returns to Step S022 to repeat the above-described operations of Steps S022 and S023. If the check result of Step S023 is YES, the process proceeds to Step S025 and the APC circuit 14 sets the amount of the laser light detected with the photoreceptor 7 as the optimum amount of laser light that the LD driver 2 is required to emit. Then, the process ends.

In this way, an optimum amount of laser light may efficiently be determined based on the optimum recording laser power which the controller 1 has obtained through the OPC process even when the size of data is relatively large and variations of the linear velocity are therefore relatively great in the data recording area.

In addition, it can be arranged in the OPC operation of FIG. 2 that the photoreceptor 7 detects the amount of laser light each time the test data is recorded in the PCA in Step S004 and, associated with such amount, the optimum recording laser power corresponding to the asymmetry value stored in the ROM 1b (or the RAM 1c) in Step S012. This arrangement may facilitate the process control of determining the laser light amount as shown in FIG. 4. In Step S031, the controller 1 applies to the LD driver 2 the optimum recording laser power, determined through the OPC operation and which corresponds to the data sector to which the data is recorded. Then, in Step S032, the APC circuit 14 sets the then laser light amount as a reference amount of laser light. This process then ends. It is necessary to establish the optimum recording laser power to each data sector particularly in recording a relatively great amount of data. Accordingly, facilitating such a process control shortens the time of operation.

It is preferable in the case of the CD-RW that the optimum recording laser power or the optimum laser light amount which is obtained through the OPC operation is recorded in the corresponding data sector during the OPC operation.

Figure 6A:
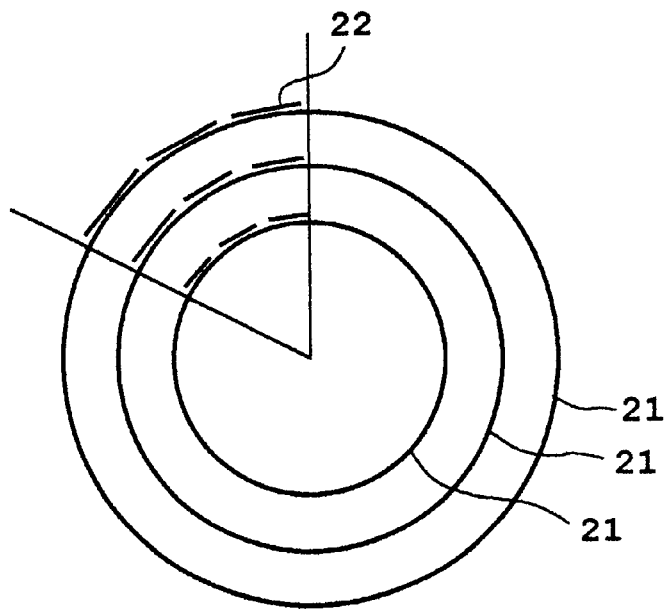
FIG. 6A is an illustration for explaining the CAV (constant angular velocity) recording format.
Figure 6B:
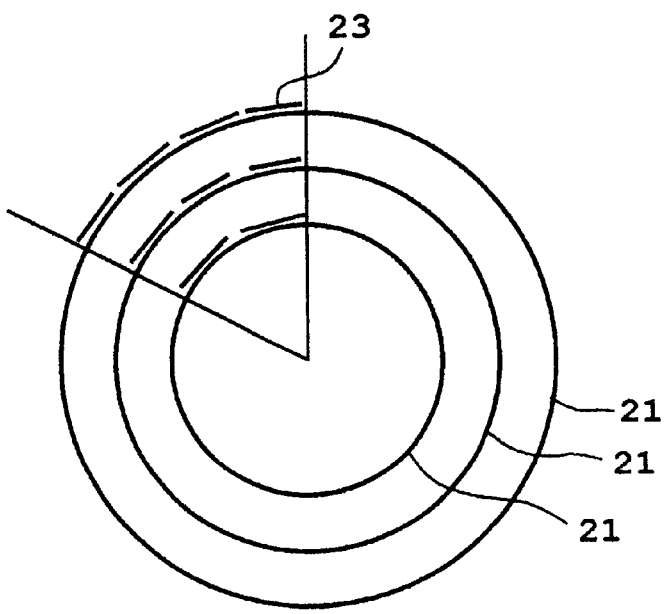
FIG. 6B is an illustration for explaining CLV (constant linear velocity) recording format.

Two ways of recording data on the optical disk 200 are conceptually rendered in FIGS. 6A and 6B. The optical disk recording apparatus 100 generally uses a CAV (constant angular velocity) format in which recording pits 22 are recorded in tracks 21 on the optical disk 200 with the spindle rotation that generates a constant angular velocity. In this case, each of the recording pits 22 becomes relatively long in an outer radius, as shown in FIG. 6A. Accordingly, a recording density in such an outer radius becomes relatively low.

On the other hand, an optical disk that has a CAV (constant angular velocity) format may be used in the optical disk recording apparatus 100. In this case, the optical disk recording apparatus 100 may increase a frequency of clock signals for generating the laser pulse as the linear velocity increases so that each recording pit 23 maintains the same length in all the tracks 21, as shown in FIG. 6B. The frequency of clock signals in the PCA may preferably be arranged to be the same as that of the data area so that the OPC operation relative to the PCA is performed at the same linear velocity as that used in the data area.

In this way, the optical disk recording apparatus 100 uses the same linear velocity as the linear velocity generated by the constant angular velocity of the spindle rotation during the OPC operation when recording data on a CD-R and a CD-RW. Thereby, an optimum laser power for each data recording location can efficiently be obtained and is applied for data recording so that the constant angular velocity can suitably be maximized.

In addition, the optical disk recording apparatus 100 obtains the optimum laser power for each of the data sectors in which data is recorded. Thereby, the optical disk recording apparatus 100 can record a relatively large amount of data in a relatively fast recording speed by suitably applying the optimum laser power according to the data sector.

Further, it may be possible for the optical disk recording apparatus 100 to obtain the optimum laser power for each of all the data sectors included in the entire data area of the optical disk. Thereby, the optical disk recording apparatus 100 can record a relatively large amount of data through several recording operations each time by suitably applying the optimum laser power according to the data sector. Thus, the large amount of data can be recorded in a relatively fast recording speed without performing the OPC each time.

Further, the optical disk recording apparatus 100 stores the laser drive current and also the laser light amount as a reference for the APC circuit. Thus, the laser power can suitably be changed and applied according to the data sector in data recording and the process control thereof can be simplified.

Further, it may be possible for the optical disk recording apparatus 100 to previously record the optimum laser power or the laser light amount for each of all the data sectors included in the entire data area of a CD-RW. Thereby, when recording data, the optical disk recording apparatus 100 reads the optimum laser power or the laser light amount to suitably apply the optimum laser power according to the data sector. The optical disk recording apparatus 100 thus obviates the OPC process.

This invention may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be protected by Letters Patent of the United States is:

1. An optical disk recording apparatus, comprising:
    a memory for storing data including values of an initial recording laser power and a reference asymmetry of a playback signal;
    a laser recording unit which emits laser light, of which amount is determined according to a value of a recording laser power supplied, and records data, using said laser light emitted, on a recording surface of a recordable optical disk having a data recording area and a test recording area thereon;
    a first motor for rotating said recordable optical disk;
    a second motor for moving said laser recording unit in and out along a radius of said recording surface of said recordable optical disk;
    an asymmetry information detect mechanism which detects asymmetry information of a playback signal from data recorded in said recordable optical disk; and
    a controller which performs an optimum laser power calibration relative to a specific area in said data recording area when required to record data in said specific area, during said optimum laser power calibration said controller instructing said second motor to move said laser recording unit to a test location in said test recording area and said first motor to rotate said recordable optical disk at a linear velocity which is the same as a linear velocity at which said data recording is to be performed at said specific area, performing said test recording at said test location for a predetermined number of times using said initial recording laser power stored in said memory with a stepwise change each time, reading asymmetry values of playback signals detected by said asymmetry detect mechanism from data recorded by said test recording, selecting an optimum asymmetry value closest to said reference asymmetry, and determining an optimum recording laser power according to said selected optimum asymmetry.

2. The optical disk recording apparatus as defined in claim 1, wherein said controller divides said specific area into a plurality of data fields and said test recording area into a same plurality of test fields, performs said optimum laser power calibration relative to each of said plurality of data fields using each of said same plurality of test fields, and stores to said memory said optimum recording laser power determined for each of said plurality of data fields through said optimum laser power calibration.

3. The optical disk recording apparatus as defined in claim 1, wherein said controller divides said data recording area into a plurality of data fields and said test recording area into a same plurality of test fields, performs said optimum laser power calibration relative to each of at lease one of said plurality of data fields where data is recorded using at least one of said same plurality of test fields, and stores to said memory said optimum recording laser power determined for each of said at least one of said plurality of data fields through said optimum laser power calibration.

4. The optical disk recording apparatus as defined in claim 1, further comprising a laser light detect mechanism for detecting an amount of said laser light which is emitted by said laser recording unit during said test recording, and wherein said amount of said laser light detected by said laser light detect mechanism is stored in said memory together with said optimum recording laser power determined according to said selected optimum asymmetry.

5. The optical disk recording apparatus as defined in claim 3, wherein said controller records said optimum recording laser power determined through said optimum laser power calibration in each of said plurality of data fields.

6. The optical disk recording apparatus as defined in claim 1, wherein said controller increases a frequency of a laser pulse for generating said laser power in proportion to an increase of said linear velocity during said data recording and said test recording.

7. An optical disk recording apparatus, comprising:
memory means for storing data including values of an initial recording laser power and a reference asymmetry of a playback signal;
laser recording means for emitting laser light, of which amount is determined according to a value of a recording laser power supplied, and records data, using said laser light emitted, on a recording surface of a recordable optical disk having a data recording area and a test recording area thereon;
first motor means for rotating a recordable optical disk;
second motor means for moving said laser recording means in and out along a radius of said recording surface of said recordable optical disk;
asymmetry information detect means for detecting asymmetry information of a playback signal from data recorded in said recordable optical disk; and
controller means for executing an optimum laser power calibration relative to a specific area in said data recording area when required to record data in said specific area, during said optimum laser power calibration said controller means instructing said laser recording means to move to a test location in said test recording area and said first motor means to rotate said recordable optical disk at a linear velocity which is the same as a linear velocity at which said data recording is to be performed at said specific area, performing said test recording at said test location for a predetermined number of times using said initial recording laser power stored in said memory means with a stepwise change each time, reading asymmetry values of playback signals detected by said asymmetry detect means from data recorded by said test recording, selecting an optimum asymmetry value closest to said reference asymmetry, and determining an optimum recording laser power according to said selected optimum asymmetry.

8. The optical disk recording apparatus as defined in claim 7, wherein said controller means divides said specific area into a plurality of data fields and said test recording area into a same plurality of test fields, performs said optimum laser power calibration relative to each of said plurality of data fields using each of said same plurality of test fields, and stores to said memory means said optimum recording laser power determined for each of said plurality of data fields through said optimum laser power calibration.

9. The optical disk recording apparatus as defined in claim 7, wherein said controller means divides said data recording area into a plurality of data fields and said test recording area into a same plurality of test fields, performs said optimum laser power calibration relative to each of at lease one of said plurality of data fields where data is recorded using at least one of said same plurality of test fields, and stores to said memory means said optimum recording laser power determined for each of said at least one of said plurality of data fields through said optimum laser power calibration.

10. The optical disk recording apparatus as defined in claim 7, further comprising a laser light detect means for detecting an amount of said laser light which is emitted by said laser recording means during said test recording, and wherein said amount of said laser light detected by said laser light detect means is stored in said memory means together with said optimum recording laser power determined according to said selected optimum asymmetry.

11. The optical disk recording apparatus as defined in claim 9, wherein said controller means records said optimum recording laser power determined through said optimum laser power calibration in each of said plurality of data fields.

12. The optical disk recording apparatus as defined in claim 7, wherein said controller means increases a frequency of a laser pulse for generating said laser power in proportion to an increase of said linear velocity during said data recording and said test recording.

13. A method for performing an optimum laser power calibration on an optical disk, comprising the steps of:
storing data including values of an initial recording laser power and a reference asymmetry of a playback signal;
providing laser recording means, movable in and out along a radius of said recording surface of said recordable optical disk, for emitting laser light, of which amount is determined according to a value of a recording laser power supplied, and recording data, using said laser light emitted, on a recordable surface of a recordable optical disk having a data recording area and a test recording area thereon;
executing an optimum laser power calibration relative to a specific area in said data recording area when required to record data in said specific area,
wherein said optimum laser power calibration comprises the steps of:
instructing said laser recording means to move to a test location in said test recording area;
rotating said recordable optical disk at a linear velocity which is the same as a linear velocity at which said data recording is to be performed at said specific location;
performing a test recording at said test location for a predetermined number of times using said initial recording laser power with a stepwise change each time;
detecting asymmetry information of a playback signal from data recorded in said recordable optical disk during said test recording;
reading asymmetry values of said playback signals generated through said test recording for said predetermined number of times;
selecting an optimum asymmetry value closest to said reference asymmetry; and
determining an optimum recording laser power according to said selected optimum asymmetry.

14. The method as defined in claim 13, further comprising the step of diving said specific area into a plurality of data fields and said test recording area into a same plurality of test fields, wherein said executing step executes said optimum laser power calibration relative to each of said plurality of data fields using each of said same plurality of test fields, and said method further comprising the step of saving said optimum recording laser power determined for each of said plurality of data fields.

15. The method as defined in claim 13, further comprising the step of dividing said data recording area into a plurality of data fields and said test recording area into a same plurality of test fields, wherein said executing step executes said optimum laser power calibration relative to each of at lease one of said plurality of data fields where data is recorded using at least one of said same plurality of test fields, and said method further comprising the step of saving said optimum recording laser power determined for each of said at least one of said plurality of data fields.

16. The method as defined in claim 13, further comprising the step of detecting an amount of said laser light which is emitted by said laser recording means during said test recording, and wherein said amount of said laser light detected in said detecting step is saved together with said optimum recording laser power determined according to said selected optimum asymmetry.

17. The method as defined in claim 15, further comprising the step of recording said optimum recording laser power determined through said optimum laser power calibration in each of said plurality of data fields.

18. The method as defined in claim 13, further comprising the step of increasing a frequency of a laser pulse for generating said laser power in proportion to an increase of said linear velocity during said data recording and said test recording.

19. An apparatus for optimum laser power calibration comprising:
   a laser recording unit for recording data onto an optical disk having a test portion recording area and a data portion recording area;
   a motor for rotating said optical disk; and
   a controller for controlling said motor to rotate said optical disk at a equal linear velocity during recording data on said test and data portion recording areas.

20. A method for optimum laser power calibration comprising the steps of:
   recording data onto an optical disk having a test portion recording area and a data portion recording area;
   rotating said optical disk utilizing a motor; and
   controlling said motor to rotate said optical disk at a equal linear velocity during recording data on said test and data portion recording areas.

21. An apparatus for optimum laser power calibration comprising:
   a laser recording unit for recording data onto an optical disk having a data recording area and a test recording area;
   a first motor for rotating said optical disk;
   a second motor for moving said laser recording unit in and out along a radius of said recording areas; and
   a controller for controlling said second motor to move said recording unit to a portion of said test recording area associated with a portion of said data recording area at which data is to be recorded, said controller causing said first motor to rotate said optical disk at a first linear velocity equal to a second linear velocity associated with recording data onto said portion of said data recording area.

22. The apparatus of claim 21 wherein said second linear velocity is calculated from a first spindle angular velocity at which data is to be recorded at said portion of said data recording area.

23. The apparatus of claim 21 wherein said first linear velocity is utilized to calculate a second spindle angular velocity at said portion of said test recording area.

24. The apparatus of claim 21 wherein said controller instructs said laser recording unit to record test data on said portion of said test recording area for a predetermined number of times.

25. The apparatus of claim 24 wherein said controller instructs said laser recording unit to read said test data on said portion of said test recording area at said first linear velocity.

26. The apparatus of claim 25 wherein said controller reads a plurality of asymmetry values of a playback signal based on said read test data for a predetermined number of times.

27. The apparatus of claim 26 wherein said controller compares said asymmetry values to a reference asymmetry value to determine said asymmetry value closes to said reference value.

28. The apparatus of claim 27 wherein said controller determines said optimum laser power utilizing said determined asymmetry value.

29. A method for optimum laser power calibration comprising the steps of:
   recording data onto an optical disk having a data recording area and a test recording area;
   rotating said optical disk utilizing a first motor;
   moving said laser recording unit in and out along a radius of said recording areas utilizing a second motor; and
   controlling said second motor to move said recording unit to a portion of said test recording area associated with a portion of said data recording area at which data is to be recorded, said controller causing said first motor to rotate said optical disk at a first linear velocity equal to a second linear velocity associated with recording data onto said portion of said data recording area.

30. The method of claim 29 further comprising the step of calculating said second linear velocity from a first spindle angular velocity at which data is to be recorded at said portion of said data recording area.

31. The method of claim 29 further comprising the step of calculating a second spindle angular velocity at said portion of said test recording area utilizing said first linear velocity.

32. The method of claim 29 further comprising the step of programming said controller to instruct said laser recording unit to record test data on said portion of said test recording area for a predetermined number of times.

33. The method of claim 32 further comprising the step of programming said controller to instruct said laser recording unit to read said test data on said portion of said test recording area at said first linear velocity.

34. The method of claim 33 further comprising the step of programming said controller to read a plurality of asymmetry values of a playback signal based on said read test data for a predetermined number of times.

35. The method of claim 34 further comprising the step of programming said controller to compare said asymmetry values to a reference asymmetry value to determine said asymmetry value closes to said reference value.

36. The method of claim 35 further comprising the act of programming said controller to determine said optimum laser power utilizing said determined asymmetry value.

* * * * *